United States Patent
Rosenbaum et al.

(10) Patent No.: US 8,812,956 B1
(45) Date of Patent: Aug. 19, 2014

(54) VIDEO CURATION PLATFORM WITH PRE-ROLL ADVERTISEMENTS FOR DISCOVERED CONTENT

(71) Applicant: Magnify Networks, Inc., New York, NY (US)

(72) Inventors: Steven J. Rosenbaum, New York, NY (US); Kimberly Peterson, New York, NY (US)

(73) Assignee: Magnify Networks, Inc., New York, NY (US)

( * ) Notice: Subject to any disclaimer, the term of this patent is extended or adjusted under 35 U.S.C. 154(b) by 0 days.

(21) Appl. No.: 14/026,153

(22) Filed: Sep. 13, 2013

(51) Int. Cl.
*G06F 3/00* (2006.01)
*G06F 3/0484* (2013.01)

(52) U.S. Cl.
CPC .................................. *G06F 3/0484* (2013.01)
USPC ........................................................ 715/716

(58) Field of Classification Search
CPC .............................. H04N 21/812; G06Q 30/02
USPC .......................................................... 715/716
See application file for complete search history.

(56) References Cited

U.S. PATENT DOCUMENTS

| | | | |
|---|---|---|---|
| 7,711,791 B2 | 5/2010 | DuVall et al. | |
| 8,117,545 B2 | 2/2012 | Rosenbaum et al. | |
| 2002/0133247 A1* | 9/2002 | Smith et al. | 700/94 |
| 2004/0045040 A1* | 3/2004 | Hayward | 725/135 |
| 2008/0281685 A1 | 11/2008 | Jaffe et al. | |
| 2012/0114302 A1 | 5/2012 | Randall | |
| 2013/0188932 A1* | 7/2013 | Hartley | 386/282 |
| 2013/0212231 A1* | 8/2013 | Shi et al. | 709/219 |

OTHER PUBLICATIONS

IAB, "A Digital Video Advertising Overview," http://www.iab.net/media/file/dv-report-v3.pdf, Jan. 2008.

* cited by examiner

*Primary Examiner* — Boris Pesin
*Assistant Examiner* — Angie Badawi
(74) *Attorney, Agent, or Firm* — David H. Judson

(57) ABSTRACT

A video curation platform displays curated video channels in the form of markup language pages. A page delivered to client machine includes thumbnails of video content that an end user may select and view. The markup language page includes a first container for supporting a first media player, and a second container for supporting a third party media player that is embedded from a content source. The containers are aligned, one in front of the other. The markup language page also includes control logic adapted to be executed in hardware at a client machine when an end user selects video content to be viewed (i) to render first content in the first media player, (ii) upon completing the first content, to automatically hide the first media player and reveal the third party media player; and (iii) to render the video content in the third party media player.

9 Claims, 9 Drawing Sheets

```html
<div id="mvp_player_video" class="clearfix">
    <div class="mvp-player-video-content" style="width: 676px; height: 405px; margin: 0px;">
        <div id="mvp_media_player_insertion_33292142">
        <div id="mvp_player_2SSKSD0R9B801T8M"></div>
        <script type="text/javascript">
                        mvpInjectScript("/decor/javascript/flowplayer.js",
                                "mvp_flowplayer_script",
                                "flowplayer",
                                function() {'
                                    "mvpInjectScript("/decor/javascript/magnify_player_embed.js?v6.3", "mvp_player_embed_scrip
                                    "MagnifyPlayer", function() {mvpInjectScript('/item/player_embed.js/2SSKSD0R9B801T8M?v2.3
                                    "mvp_player_config_script","player_config_2SSKSD0R9B801T8M", function()
                                    {loadFlowplayer_2SSKSD0R9B801T8M(); });
                                    }
                                )
                                }
                            }
                        );

swapClips = function() {
                                document.getElementById("mvp_player_2SSKSD0R9B801T8M").style.display = "none";
                                document.getElementById("mvp_video_2SSKSD0R9B801T8M").style.display = "block";
                        } var player_2SSKSD0R9B801T8M = '';
                        loadFlowplayer_2SSKSD0R9B801T8M = function() {
                                player_config_2SSKSD0R9B801T8M.width = 676;
                                player_config_2SSKSD0R9B801T8M.height = 405;
                                player_config_2SSKSD0R9B801T8M.standalone_preroll = 1;
                                player_config_2SSKSD0R9B801T8M.autoplay = true;
                                player_2SSKSD0R9B801T8M = new MagnifyPlayer.Embed(player_config_2SSKSD0R9B801T8M);
                        };
        </script>

<div id="mvp_video_2SSKSD0R9B801T8M" style="display: none;" class="mvp_video_background">

<script type="text/javascript" src="/decor/javascript/swfobject.js"></script>
            <script type="text/javascript">
                        var mvp_swfo = new SWFObject("http://www.youtube.com/v/ujQIHVrNthI&rel=0&
                        fs=1&showsearch=0&enablejsapi=1&modestbranding=1&autoplay=1&
                        playerapiid=mvp_swfo_embed_2SSKSD0R9B801T8M_815403190",
                        "mvp_swfo_embed_2SSKSD0R9B801T8M_815403190", "676", "405", 9);
                        mvp_swfo.addParam("allowfullscreen", "true");
                        mvp_swfo.addParam("allowscriptaccess", "always");
                        mvp_swfo.addParam("id", "mvp_swfo_embed_2SSKSD0R9B801T8M_815403190");
                        mvp_swfo.addParam("quality", "high");
                        mvp_swfo.addParam("wmode", ":opaque");
                        mvp_swfo.addParam("loop", "false");
                        mvp_swfo.write("mvp_swfo_div_270483758");
            </script>
```

FIG. 6

```
var player_config_2SSKSD0R9B801T8M = {
        id: '2SSKSD0R9B801T8M',
        title: 'PVC Pipe Bow Compilation',
        description: 'I created this video ...
        keywords: 'camouflage, PVC, forest, pipe, fire, backyardbowyer, archery',
        permaLink: 'http://clueinc.magnify.net.kimberly.dev.magnify.net/video/PVC-Pipe-Bow-Compilation',
        container: 'mvp_player_2SSKSD0R9B801T8M',
        skin: true,
        autohideControls: false,
        logo: {
                url: 'http://media.magnify.net/decor/images.magnify_watermark.png',
                width: 91,
                height: 28,
                top: 10,
                right: 10
        },
        videoAds: {
            "tag" :  {
                    "domain_id" : "257OuiynCgx",
                    "url" : "http://shadow01.yumenetworks.com/"
            },
            "config" : {
                    "plugin" : "yume",
                    "ad_server" : null,
                    "tag_key" : "yume_tag",
                    "package" : "Magnify: :Ads: :Video: :Generic"
            },
            "service" : "yume"
        },
        colors: {
                timeColor: '#919191',
                bufferColor: '#464646',
                progressColor: '#F7F7F7',
                buttonColor: 'transparent',
                durationColor: '#919191',
                backgroundColor: '#191919', backgroundGradient: 'none'
        },
        scaling: 'fit',
        clips: {
                splash: { url: 'http://s3.amazonaws.com/magnifythumbs/2SSKSD2CV110QSWY-1.jpg' }
        }
}
```

FIG. 7

```
MagnifyPlayer.Embed = Class.create(MagnifyPlayer.Base, {
    initialize: function(config) {
        this.baseInitialize( config );
        this.id = config.id;
        currentCID = this.id;

this.container = config.container;
        this.skin = config.skin || false;
        this.autohideControls = config.autohideControls || false;
        this.customPlayButton = config.customPlayButton;
        this.colors = $H(config.colors);
        MagnifyPlayer.controlSkin = config.colors;
        this.clips = config.clips;
        this.splash = this.clips.splash;

...

if ( config.standalone_preroll ) {
            standalonePreroll = true;
        }
        if ( typeof disablePreroll != 'undefined') && disablePreroll ) {
        } else {
            this.disablePreroll = config.disablePreroll;
        }

//in-video ads
        this.videoAds = config.videoAds || { service: '', tag: {}, config: {} };

this.playerVersion = '/decor/players/flowplayer_3_2/flowplayer-3.2.7.swf';
        this.contentVersion = '/decor/players/flowplayer_3_2/flowplayer.content-3.2.0.swf';

...

this.abortBuild = false;
        this.checkBandwidth();
    },
    buildPlayer: function() {
        var defaults = this.createDefaults();
        var config = this.createConfig();

if ( this.abortBuild ) {
            if ( typeof swapClips != 'undefined' ) {
                swapClips();
            }
        } else {
            this.flowplayer = flowplayer(this.container, defaults, config);
            if ( this.config.autoplay && this.config.trackingCallback ) {
                this.startTrackingClips();
            }
            if ( this.config.autoplay && this.config.omnitureHook ) {
                this.addTrackingHook ( this.config.omnitureHook );
            }
            MagnifyPlayer.playerHash[this.container] = this.flowplayer;
            MagnifyPlayer.playerArray.push( this.flowplayer );
```

FIG. 8

```
buildPlayer: function() {
        var defaults = this.createdefaults();
        var config = this.createConfig();
                if ( this.abortBuild ) {
                        if ( typeof swapClips != 'undefined' ) {
                                swapClips();
                        }
                ...
        createConfig: function() {
        var prerollKey = this.clipkey.get('preroll');
        var playlistKey = this.clipkey.get('playlist');
        var config = {};
        config.clip = {};
        config.clip.url = this.splash.url;
        config.clip.autoBuffering = this.config.autoplay;
        config.clip.scaling = (this.config.scaling || "fit");
        ...
        config.playlist = this.createPlaylist();
        config.plugins = {};
        if ( this.preroll && this.preroll.get(prerollKey) ) {
                config.plugins.countdown = this.createCountdown();
        }
        ...
        config.plugins.controls = this.createControls();
        if ( this.customPlayButton ) {
                config.play = this.createPlayButton();
        }
        return config;
},
createPlaylist: function() {
        var playlistArray = new Array();
        var prerollKey = this.clipKey.get('preroll');
        var bumperKey = this.clipKey.get('bumper');
        var playlistKey = this.clipKey.get('playlist');
        var postrollKey = this.clipKey.get('postroll');

if ( this.splash && !this.config.autoplay ) {
                var splash = this.createSplash();
                playlistArray.push(splash);
        }
        if ( this.preroll && this.preroll.get(prerollKey) && !this.disablePreroll ) {
                var preroll = this.createPreroll();
                playlistArray.push(preroll);
        }
        ...
        if ( this.playlist && this.playlist.get(playlistKey) ) {
                var clip = this.createPlaylistClip( this.playlist.get( playlistKey ) );
                playlistArray.push(clip);
        }
        var playlist = playlistArray;
```

FIG. 9

VIDEO CURATION PLATFORM WITH PRE-ROLL ADVERTISEMENTS FOR DISCOVERED CONTENT

This application includes subject matter that is protected by copyright. With respect to that work, all rights are reserved.

BACKGROUND

1. Technical Field

The subject matter herein relates generally to online content publishing and promotion.

2. Background of the Related Art

It is known in the prior art to provide and operate, as a service, a platform for video curation, publishing and monetization. In this approach, the platform is operated by a service provider as a managed or hosted service (software-as-a-service) that is accessible by users, who create video channels (or sites). After creating and customizing a channel site, the site creator can list the site in a public directory of video channels (or maintain the site private) and can send electronic messages inviting people to visit the site. Using a search tool, the creator (or others having permission) can cause the system to meta-search and then populate the channel with video content. Web users who visit a web address associated with the system receive a customized web interface that contains channel content and metadata, and that allows for various user interactions such as viewing, rating, comment, upload, sharing, playlist creation, video communities, and revenue sharing. The platform provides brands, publishers, and web destinations with a scalable and rapidly-extensible video curation platform that includes video discovery and curation technology to enables publishers to create large, high quality collections of content that they can share, contextualize, and monetize.

In 2006, the Interactive Advertising Bureau (IAB), an industry group, defined a video ad as a commercial that may appear before, during, or after a variety of content in a player environment. One type of digital video ad experience is "in-stream" video advertising. This refers to a video ad experience viewed within or around video content from a video player. One type of in-stream video ad is a "linear" ad that is presented before, in the middle of, or after the video content requested by a user is consumed. A linear ad that is presented before the video content is also known as a pre-roll.

It would be desirable to enable pre-roll to be configured and delivered on web pages in a video curation platform of the type described.

BRIEF SUMMARY

A display method is operative at a video curation platform. The platform displays curated video channels in the form of server-generated markup language (e.g., HTML) pages. A page delivered to an end user client machine includes one or more thumbnails of video content that an end user may select and view. The markup language page includes a first container for supporting a first media player, and a second container for supporting a third party media player that is embedded from a content source. The containers are aligned, one in front of the other. The markup language page also includes control logic adapted to be executed in hardware at a client machine when an end user selects video content to be viewed (i) to render first content in the first media player, (ii) upon completing the first content, to automatically hide the first media player and reveal the third party media player; and (iii) to render the video content in the third party media player.

The foregoing has outlined some of the more pertinent features of the disclosed subject matter. These features should be construed to be merely illustrative. Many other beneficial results can be attained by applying the disclosed subject matter in a different manner or by modifying the technique, as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 6 is a portion of a server-generated player page that includes two player embeds and control logic that controls the showing/hiding of the players and the swapping between them according to this disclosure;

FIG. 7 is a portion of player configuration for the system player that runs the pre-roll content in the HTML portion of the code in FIG. 6;

FIG. 8 is a portion of a player generation library that reads the player configuration of FIG. 7 and creates the system player that loads the pre-roll; and FIG. 9 is a portion of a script that sets up event triggers for various ad servers that are supported by the system and that trigger the player swap operation.

DETAILED DESCRIPTION OF AN ILLUSTRATIVE EMBODIMENT

Figure 1:
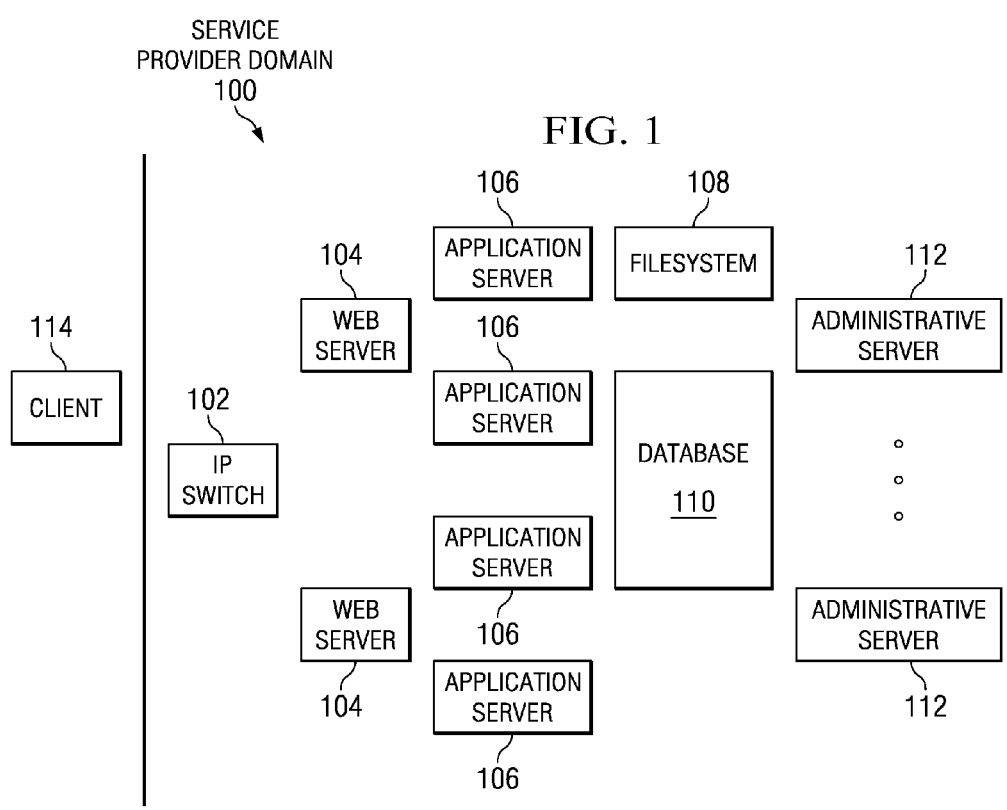
FIG. 1 is a simplified block diagram of a set of system components that provide a known hosted video discovery and publishing platform.

FIG. 1 illustrates representative system architecture for use in implementing the subject matter described herein. The architecture is implemented in or across one or more Internet accessible data centers as a web site (typically, a set of web pages) together with associated applications running behind the site. End users operate Internet-accessible devices (e.g., desktop computers, notebook computers, Internet-accessible mobile devices, phones or other devices having rendering engines, or the like) that are capable of accessing and interacting with the site. An end user machine has a web browser, a mobile app or other rendering engine that is compatible with AJAX technologies (e.g., XHTML, XML, CSS, DOM, JSON, and the like). An end user accesses the site in the usual manner, i.e., by opening the browser (or mobile app) to a URL associated with a service provider domain. The user may authenticate to the site (or some portion thereof) by entry of a username and password. The connection between the end user entity machine and the system may be private (e.g., via SSL). Although connectivity via the publicly-routed Internet is typical, the end user may connect to the system in any manner over any local area, wide area, wireless, wired, private or other dedicated network. As seen in FIG. 1, the "server side" of the system 100 typically comprises an IP switch 102, a set of web servers 104, a set of application servers 106, a file system 108, a database 110, and one or more administrative servers 112. A representative web server is Apache (2.0 or higher) that executes on a commodity machine (e.g., an Intel-based processor running Linux 2.4.x or higher). An application server executes the one or more applications that provide the features of the site, including site creation and customization, video meta-search, content reviewing and filtering, commenting, tagging, playlists, user registration and profiles, affiliate signup, and so forth. The filesystem 108 preferably is an application level distributed system that operates across a number of servers using an HTTP interface. The database 110 may be implemented using MySQL, or any other convenient system. The administrator servers 112 handle other back end processes that are used at the site or otherwise to facilitate the service; these back end processes including, for example, user registration, billing, administration, and interoperability with third party sites and systems as may be required. As also seen in FIG. 1, the system includes client side code 114 that executes natively in the end user's web browser or other rendering engine. Typically, this code is served to the client machine when the end user accesses the site, although in the alternative it may be resident on the client machine persistently.

The above-described architecture may comprise a hosted video discovery and publishing platform. A platform of this type is described in U.S. Pat. No. 8,117,545; the disclosure of that patent is incorporated by reference. As described, the system is a multi-tier hosted service that can be customized and managed by the creators of affiliate sites. The client-side interface preferably is based on current web technology standards, including HTML5 and CSS stylesheets. The web interface is compatible with standard browsers including, without limitation, Internet Explorer on Windows, Firefox on multiple platforms, and Safari on Mac OS X and Windows. Supporting tools include Adobe Flash player and available JavaScript libraries. Client-side interfaces include, without limitation, dynamic web pages with JavaScript for visual effects and AJAX functionality, embeddable widgets developed in Flash and HTML that can be placed on other sites, RSS feeds that provide alternate ways of accessing content, and the like. The server-side application is built on a common software suite that includes Apache, MySQL, and Perl. The server-side application is a generic Linux/Unix/Posix-style environment and is easily portable to other equivalent server platforms. The system also supports H.264 and other encoding protocols.

Figure 2:
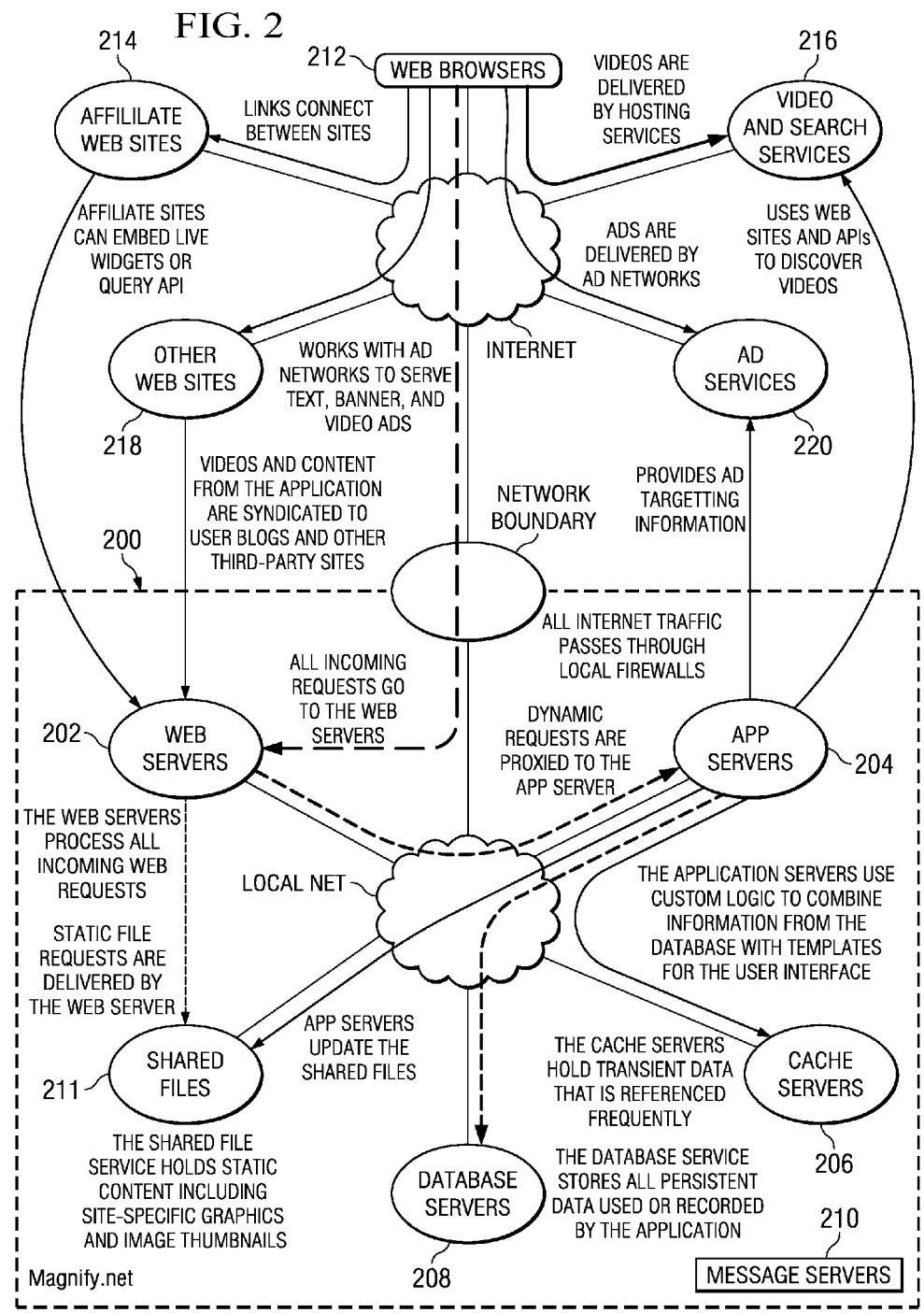
FIG. 2 illustrates how the various functional components of the system in FIG. 1 interact with one another.

As further described in U.S. Pat. No. 8,117,545, the primary elements of the service architecture and the typical flows of requests between them are represented in FIG. 2. As noted above, the main functional components of the system are implemented at an Internet-accessible system site 200, which is this case is reached by opening a browser or mobile app to the domain magnify.net (this domain is merely representative, and it is a service mark of the assignee of this application). As can be seen, the server-side functionality is partitioned into several tiers as follows: a web server tier 202, which delivers static files and act as a load balancing proxy for the application servers; an application server tier 204, which combines dynamic page templates with custom logic and functionality; a caching server tier 206, which provides a shared repository for short-term storage of frequently used data; a database server tier 208, which stores, searches and updates all persistent information within the system; and a messaging server tier 210, which sends automatic notifications and accepts content from email or mobile SMS. A shared file service 211 holds static content including site-specific graphics and image thumbnails. The application server also interacts with other Internet services in a variety of ways: video hosting (post, retrieve and embed video content from third-party hosting services); advertising networks (retrieve and embed targeted advertising from third-party ad servers); and affiliated sites (XML APIs enable integration with other sites operated by affiliates).

End-users, site creators and others access the system through web browsers 212. Site channels (as will be described) typically are associated with an affiliate's primary or "home" web site, and these sites are identified by reference numeral 214. As indicated, affiliate sites can embed live widgets or query the system's API. As will be described in more detail below, the system discovers, annotates and embeds video content from multiple video and search services, which services are indicated by reference numeral 216. The system uses web sites and APIs to discover videos from such services. If desired, videos and content from the application may be syndicated to user blogs and other third party sites 218. The system also interoperates with advertising services and networks 220 to serve text, banner and video advertisements. The system components illustrated in FIG. 2 are a representative embodiment; it is not required that all such components be included, or that the identified boundaries be as shown. One of more components may be combined or associated with the system or other entities, as the case may be, without departing from the scope of the described subject matter. It is not required that the components be located within the same data center. As will be seen, the site preferably comprises a set of machines that execute a set of processes. A function may be implemented in a distributed manner, e.g., across a set of Intel processor (or equivalent)-based Linux (or equivalent)-based server machines that are connected in a local area network, or in any other convenient manner.

Figure 3:
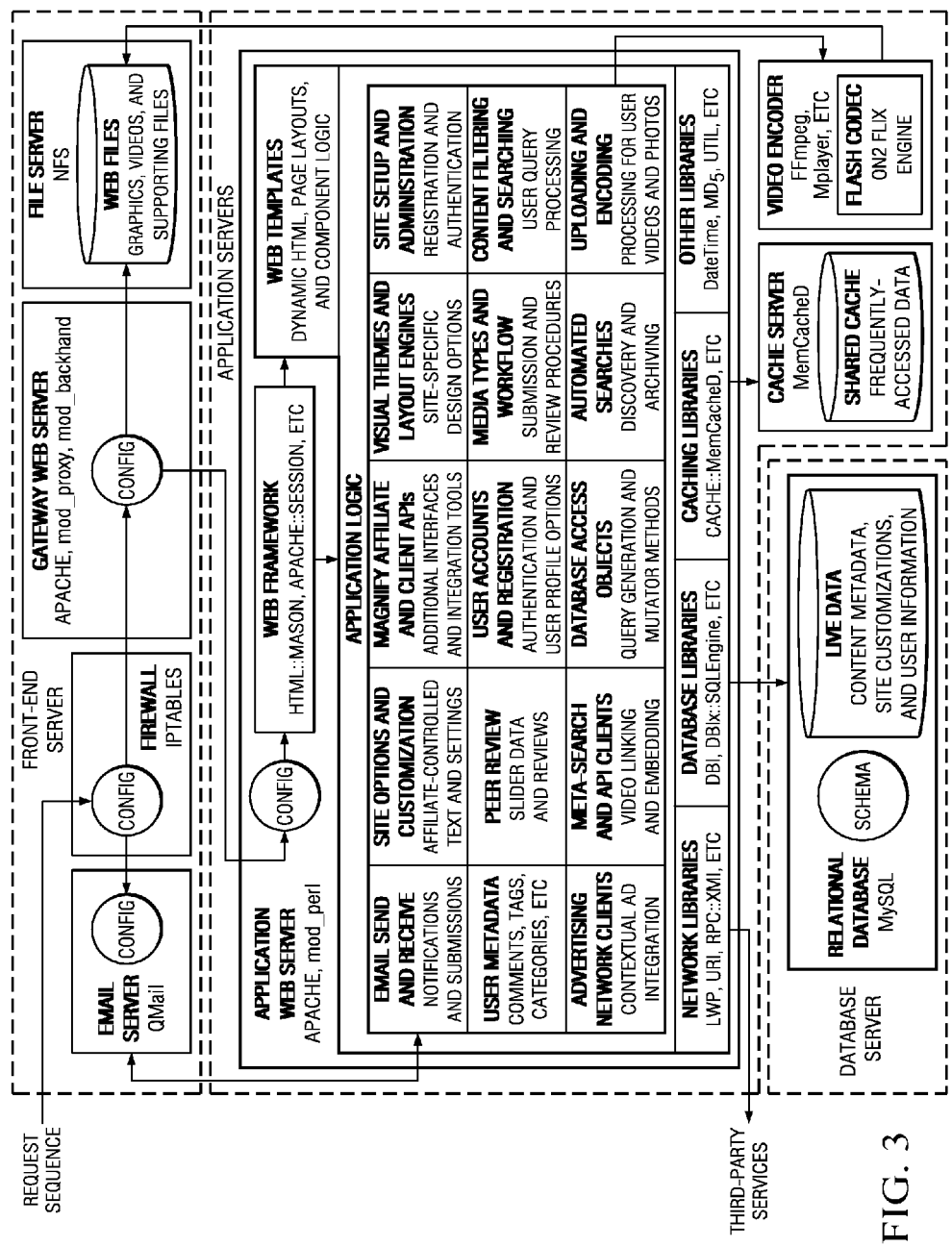
FIG. 3 illustrates a more detailed block diagram of the server-side components of the video discovery and publishing platform of FIG. 1.

FIG. 3 illustrates the primary modules of the server-side and how these modules interrelate to one another. As can be seen, the application logic comprises a number of functional components that will now be described in the context of a typical user interaction with the system. During such interaction, various displays are exported to the user's web browser, and these displays are described and illustrated below.

Generally, the system provides any Internet user with the ability to quickly set up and customize a video channel, preferably as a web page or site that can be reached from any Internet-accessible device having a web browser. The solution includes tools for use by channel site creators to customize the look, feel, and page design. A particular web page or site may be associated with a given subject. As used herein, a page or site that has such an association is sometimes referred to as "subject-specific." Although not meant to be limiting, once a subject-specific channel is created, a site administrator or individual visitors can search across the web and choose to bring those search results into the channel architecture. The system also enables a multiplatform search as an integrated part of a library build; if desired, search results are automatically populated into the channel content. The system also enables the characterization of the material returned, preferably according to a user-generated taxonomy. In one embodiment, the taxonomy may be developed from a collaborative filtering review that extends beyond the search characteristics. The system thus facilitate the process of discovery and organization within a vertical channel of online video content, drawing in videos from all over the Internet, and collecting them in new topical contexts, where they can be annotated by members of a social network, online community, or other group with a shared interests.

Preferably, the system provides links to or embedded players for content that is hosted on multiple third-party web sites. Web browsers then display these independently-hosted videos in the context of the system's web pages. It is not required that the system copy, host, or serve those embedded videos, which typically are delivered by third parties under their own terms and licenses.

A typical user interaction with the system begins with channel creation. In a typical use scenario an end user operating a client machine navigates to the site's home page via a web browser or mobile app. In this embodiment, a site creator (an individual, an entity, or the like) is directed to a web site where they are given the tools to create a channel name and to select a user name and password, and are provided with site design and layout tools. Using an interface, the user can identify the channel and associated keywords, select a content category (via the dropdown list selections), determine whether to allow others to post videos on the site (via the dropdown list selections), indicate (via the radio buttons) whether the channel will be public, unlisted or private, and select a channel listing identifier that can be uploaded from the user's machine. The user may be provided with a set of one or more pre-configured site templates. Other tools may be provided to enable the user to manage the channel. For example, the user can request the system to automatically find videos from third party sites that match the keywords identified by the user. This search can be repeated periodically if the user indicates in a check box (or other UI widget). Alternatively, the user can search and select videos from across the web (instead of having the system perform the meta-search). In another option, the user can upload videos from his or her computer by selecting that option. The system also may provide a number of site administration tools. This includes setting up and managing administrators, enabling email or other invitations, setting advertising (revenue sharing) options, and providing access to site statistics. The user may also be permitted to customize the site's options and configuration including: site name and web address, site description, whether and to what extent community interaction with the site will be permitted, video submission and peer review policies for the site, as well as formats and playback options. The system may also provide automated tools to facilitate the video discovery and submission process. For example, the user can direct the system to automatically repeat this auto-find and posting process every configurable number of days and to group results according to one or more identified meta-tags.

The system provides a managed or hosted service that is scalable and highly reliable. Multiple users create video channels, which are web pages (or sites). (A web site is a set of one or more pages). After creating and customizing a channel site, the site creator can list the site in a public directory of video channels (or maintain the site private) and can send electronic mail messages inviting people to visit the site. The channel site is associated with one or more DNS host names associated with the system. Using a search tool, the creator (or others having permission) cause the system to meta-search and then populate the channel with video content. Web users who visit a web address associated with the system receive a customized web interface that contains channel content and metadata, and that allows for various user interactions such as viewing, rating, comment, upload, sharing, playlist creation, video communities, and revenue sharing. The system provides an infrastructure by which a large number of sites that are looking to become part of an online ecosystem (but that do not have the technology or focus on video required) to reach a larger audience. By enabling videos to be identified and classified according to (preferably user-configurable) site-specific categories, the system enables aggregated audiences for content that might otherwise not even be seen.

The system may interact with one or more e-commerce, ad-serving, payment, promotion, and distribution systems as required. One of more of such components may be performed natively, or through web-based or other interaction with third party systems.

Without limitation, a representative video curation, publishing and monetization platform of the type described above is Magnify.net of New York, N.Y.

Preferably, video site administrators use the curation tools to locate and embed videos from a wide number of content partners. These videos are embedded into the video web site but preferably remain hosted at third-party web sites (the third-party player).

Preferably, the system offers publishers/site owners with an application programming interface (API) and tools to build single-view and multi-view embeddable players (e.g., by constructing URLs based on video permalinks on the video site), to load playlists, and to configure various player features (e.g., player width, player height, player layout, player skin, whether the player auto-plays and when, and others).

Configuring Pre-Roll Ads for Discovered Content

The above-described platform provides a solution that allows for the process of delivering pre-roll advertisements in a separate video player than the third party content, e.g., content embedded from open APIs. According to the technique herein, an additional extension to this technology is provided to enable curators with the ability to sell advertising inventory on their created and hosted pages before requested video from third party players is presented on customer pages. This technique is sometimes referred to herein as Pre-Roll Everywhere™, a service mark of Magnify.net. In one preferred approach, the publisher uses the video discovery and curation technology described above, namely, keyword and tag searches, as well as site specific searches, to gather content from a wide range of services. Once gathered, this content is curated, organized, categorized and published, as one or more content pages/channels. The publisher then accesses advertising inventory, e.g., via an integration with any iAB VAST 2.0-compliant ad server. Using an advertising campaign manager tool/interface, pre-roll advertising is then targeted to keywords, playlists, or run-of-site distribution. Visitors to the channel/site are then presented with thumbnails of properly-curated content. Once a visitor clicks on the thumbnail, the system is posted on the page, and via the system player a pre-roll advertisement is called and presented to the visitor. After the pre-roll completes, the system player sends an event (e.g., back to a database), and a third party video player is called and the originally-requested video (as represented by the thumbnail) is presented.

Generalizing, the platform exposes interfaces and tools that enable publishers and site owners the ability to target campaigns to appropriate keywords and curated collections. According to the techniques of this disclosure, the publisher/site owner also can grow its inventory collection by curating and mixing video from trusted sources, its own content, and collected and curated content. One particular monetization strategy is to provision and implement pre-roll advertisements for all types of content, even discovered content. Preferably, the platform has (or can access from a third party) the capability to match visitors to videos and ads, expanding inventory and broadening engagement opportunities on each video landing page. Preferably, the actual pre-roll creative (content) is delivered via ad tags from third party ad networks.

Preferably, the platform provides a video advertising campaign manager tool or interface (a set of Internet-accessible pages) that enables a publisher/site owner to manage advertisements that are associated with the content channel. The video campaign manager enables the publisher to create and manage ad campaigns, e.g., in different areas of the content channel, and to provision and deliver custom advertising experiences such as co-branding sponsorship, full-page ad unit takeovers, and the like. Using the video campaign manager tool, and according to this disclosure, video site administrators configure ad tags provided by third-party ad servers and advertising networks to run video pre-roll ads in a video player hosted on and controlled by the system (the system player). In addition, and using this tool, video site administrators also set rules, called Ad Campaigns, that allow the grouping of video site content by search terms, tags, source, date, length and location within the video site. Using the tool, separate ad tags also are assigned to different Ad Campaigns to allow targeted advertising to display in different contexts throughout the video site depending on the rules assigned to the content being viewed. Further, using the tool, video site administrators control whether or not video pre-roll ads are displayed in front of videos that have been embedded from third-party web sites, and they can configure ad tags and set up Ad Campaigns targeted only at third-party players. If this latter configuration (Pre-Roll Everywhere™) is enabled, the system generates custom HTML, CSS and javascript code that allows video pre-roll to display in the system player before displaying the third-party player to the user.

Figure 4:
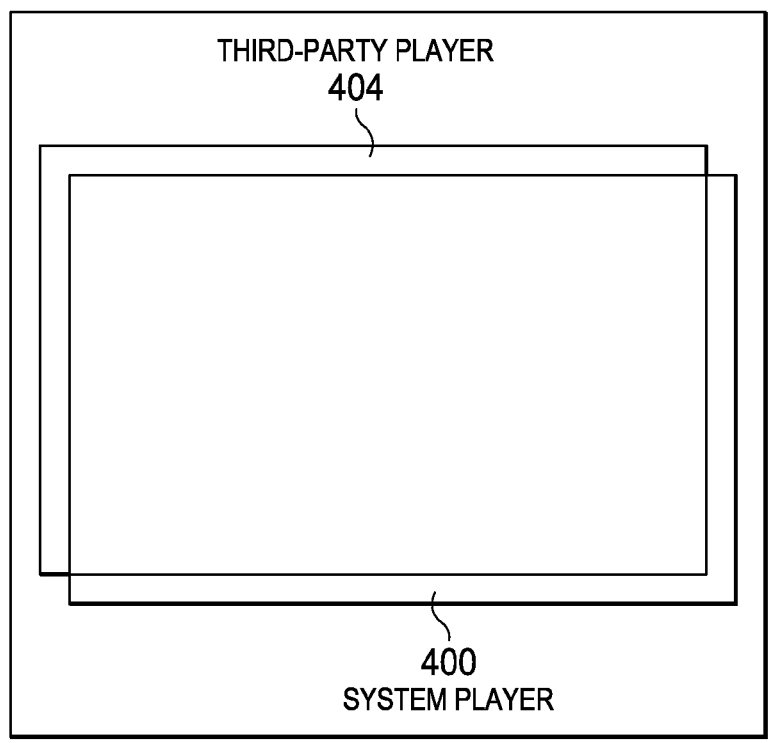
FIG. 4 illustrates a system player and a third party player that are used to provide pre-roll content according to this disclosure.

In particular, and with reference to FIG. 4, when a user requests a web page that contains a third-party player, the system preferably generates custom HTML code that contains two separate players, namely, a system player 400 that is configured to request an ad tag from a third-party ad server or ad network, and the third-party player 404 that is configured to request the video content that the user wishes to view. The third party-player 404 is embedded from a content source. In addition, the system generates custom CSS code that controls the layout and visibility of the two players. In a preferred operation, the system player is made visible to the user, and the third-party player is hidden from the user, but the two players are positioned in such a way that they appear to occupy the same area within the HTML layout. The system further generates custom javascript code that is designed to load ad tags into the system player, listen for events coming from the system player that indicate when an ad is loaded, playing and completed, and control the visibility of the system player and the third-party player in the web page. The scripts and CSS comprise control logic for managing the rendering, hiding and swapping of the players.

Figure 5:
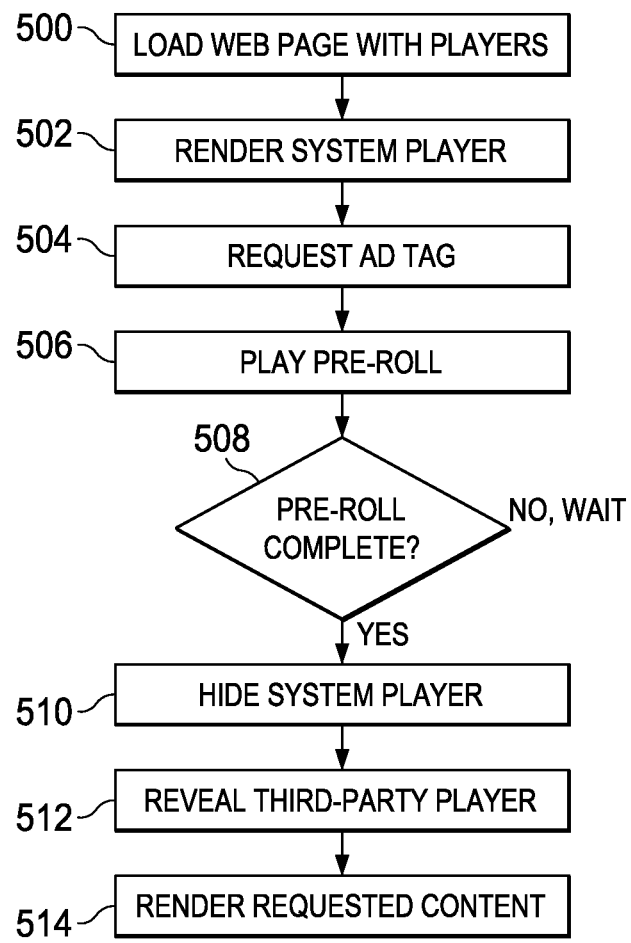
FIG. 5 is a process flow illustrating a preferred pre-roll operation according to this disclosure.

The preferred operation is as follows, and as described in the process flow in FIG. 5. When the web page loads (step 500), the system player renders (step 502), requests the ad tag from the third-party ad server or ad network (step 504) and immediately begins playing the video pre-roll contained in the response (step 506). When the video pre-roll has completed (step 508), the system player receives an event that allows it to trigger the custom javascript that hides the system player (step 510), reveals the third-party player (step 512), and allows the third-party player to begin playing automatically (step 514). Because the players are laid out in such a way that they are the same size (or approximately so) and appear to occupy the same space within the HTML page, this gives the illusion that the advertising content and the requested video content are a seamless experience, despite being presented in two separate video players. From the requesting user's perspective, the fact that two distinct players are being used is not apparent.

The following describes representative HTML of a server-generated player page that represents the two player embeds, namely, the system player, and a third party player. This code also includes in-line script and CSS that controls the showing/hiding of the players and the swapping between them. The player page begins with a container that wraps both players:
<div id="mvp_player_video" class="clearfix">
<div class="mvp-player-video-content" style="width: 676px; height: 405px; margin: 0px;">
A container is then included to receive the system player:
   <div id="mvp_media_player_insertion__33292142">
   <div id="mvp_player__2SSKSD0R9B801T8M"></div>
When the page loads, the latter container (and thus the system player) is visible. At this point, a script ("mvpInjectScript"), such as illustrated in FIG. 6 then loads. The first portion of the script loads the system player into the above-described container. In particular, the mvpInjectScript sets up a chain of functions that loads libraries to produce a player. The first function loads a library flowplayer.js into the head block of the page, if not already loaded. Once that library loads, the next function ("magnify_player_embed_js") loads a custom player library. Once that library loads, the next function loads an external configuration file for this player. Once the play configuration loads, a player load function is called to create the player. The "swapClips()" function sets up a function that allows swapping between the system player and the third party player. In particular, the function hides the system player and reveals the third-party player that has already been loaded (but is otherwise hidden initially). The additional code sets up an additional player configuration specific to the page and creates the player. Thus, e.g., the "standalone_preroll=1" parameter tells the player configuration that pre-roll will be playing in this player without loading additional videos into a playlist.

As also seen in FIG. 6, the page includes HTML to create and instantiate a container ("mvp_swfo_div__270483758") that wraps the third party player. After that second container is defined, another script ("swfobject.js") is provided, and its function is to generate a third party video embed and place it in the second container. This player is set to autoplay because it is currently set to display: none (and thus is hidden initially). It does not begin playing until its display value is set (by the swapClips function) to block.

FIG. 7 illustrates an external JSON player configuration for the system player that is provisioned to run pre-roll in the HTML portion of the code shown in FIG. 6. This configuration specifies the ad server and ad tag to use, along with tags and a description of the third party video (for ad targeting purposes).

FIG. 8 illustrates a portion of a custom player generation library that reads the JSON player configuration (from FIG. 7) and creates a system-hosted player that loads the pre-roll.

FIG. 9 illustrates a portion of a script that sets up one or more event triggers for one or more various ad servers that are supported by the platform. The particular event trigger (which is specific to each ad server is omitted). As described, upon a trigger event that indicates the pre-roll (in the system player has completed), the hosted player is hidden and the third party player is revealed. This file also contains code to trigger player swapping in the HTML markup of FIG. 6. In particular, the "buildPlayer" function creates a new system player. The "createConfig" function creates the configuration for this specific player. The "createPlaylist" function queues up one or more video files that will play through this player. If the player is configured for standalone pre-roll, this function loads up a single blank clip.

One or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

While the system has been described in the context of video and video clip discovery and publishing, this is not a limitation of the invention. The techniques of the invention may be used for photos, graphics, music, software, or other content.

While given components of the system have been described separately, one of ordinary skill will appreciate that some of the functions may be combined or shared in given instructions, program sequences, code portions, and the like.

Having described my invention, what I now claim is as follows:

1. A method operative in association with a curated video channel that includes a reference to a third party media player that renders third party video content in the third party media player, comprising:
   receiving data that configures the curated video channel to associate first content, as a pre-roll advertisement, with the third party video content associated with the curated video channel;
   delivering a markup language page in response to receiving a request for the third party video content from a viewer of the curated video channel, the markup language page having instructions to build a first media player, and a container for supporting the third party media player, the markup language page also including control logic adapted to be executed in hardware in response to the request for the third party video content:
   (i) to render the first content in the first media player in lieu of rendering the third party video content that was requested;
   (ii) upon completing the first content, to automatically hide the first media player and reveal the third party media player; and
   (iii) to render the third party video content in the third party media player;
   wherein the instructions to build the first media player include a script that is executed upon delivery of the markup language page to create a class object, to request a player configuration, the player configuration being specified at least in part by the received data, to receive the player configuration, and to instantiate the first media player according to the received player configuration.

2. The method as described in claim 1 wherein the control logic is further operative to hide the third party media player as the first content is rendered in the first media player.

3. The method as described in claim 1 wherein the control logic is responsive to an event trigger to automatically hide the first media player and reveal the third party media player.

4. The method as described in claim 1 wherein the markup language page is delivered from a server that hosts a curated video channel.

5. The method as described in claim 4 wherein the first content is video content selected by a publisher of the curated video channel.

6. The method as described in claim 1 wherein the control logic is further operative to display a thumbnail of the video content upon load of the markup language page.

7. The method as described in claim 6 wherein the control logic is further operative to perform sub-steps (i)-(iii) upon receipt of second data indicating a selection of the thumbnail.

8. An article comprising a non-transitory machine-readable medium that stores a program, the program being executable in association with client hardware:
   to display a thumbnail of third party video content, the third party video content associated with a curated video channel, the curated video channel having been configured by received configuration information to associate a pre-roll advertisement with the third party video content;
   upon receipt of data indicating a selection of the thumbnail, to receive a markup language page that includes a set of instructions that are executed by the client hardware:
   (i) to build a first media player, and to render the pre-roll advertisement in the first media player in lieu of the third party video content that was selected;
   (ii) upon completing the pre-roll advertisement, to automatically hide the first media player and reveal a third party media player, the third party media player being embedded from a source of the third party video content; and
   (iii) to render the third party video content associated with the thumbnail in the third party media player;
   wherein the instructions to build the first media player include a script that is executed upon receipt of the markup language page to create a class object, to request a player configuration, the player configuration having being specified at least in part by the received configuration information to retrieve and render the pre-roll advertisement, to receive the player configuration, and to instantiate the first media player according to the received player configuration.

9. A system, comprising:
   server hardware and software upon which a network-accessible publisher site is hosted, the publisher site including a curated video channel that includes at least one reference to a third party media player that renders third party video content in the third party media player;

a management interface hosted by the server hardware and software and adapted to receive data that configures the curated video channel to associate first content, as a pre-roll advertisement, with the third party video content associated with the curated video channel;

a markup language page dynamically-generated by the server hardware and software in response to receiving a request for the third party video content, the markup language page having instructions to build a first media player, and a container for supporting the third party media player, the markup language page also including control logic adapted to be executed in hardware at a client machine in response to the request for the third party video content:

(i) to render first content in the first media player in lieu of the third party video content that was selected;

(ii) upon completing the first content, to automatically hide the first media player and reveal the third party media player; and (iii) to render the third party video content in the third party media player;

wherein the instructions to build the first media player include a script that is executed upon delivery of the markup language page to create a class object, to request a player configuration, the player configuration being specified at least in part by the received data, to receive the player configuration, and to instantiate the first media player according to the received player configuration.

* * * * *